Nov. 6, 1923.

A. C. KELLER 1,472,844

POWER TRANSMITTING MECHANISM

Filed Oct. 20, 1919

Inventor
Arthur C. Keller
By Erwin Wheeler & Woolard
Attorneys

Witness

Nov. 6, 1923.

A. C. KELLER 1,472,844

POWER TRANSMITTING MECHANISM

Filed Oct. 20, 1919  3 Sheets-Sheet 3

Patented Nov. 6, 1923.

1,472,844

UNITED STATES PATENT OFFICE.

ARTHUR C. KELLER, OF MILWAUKEE, WISCONSIN, ASSIGNOR TO PAWLING & HARNISCHFEGER COMPANY, OF MILWAUKEE, WISCONSIN, A CORPORATION OF WISCONSIN.

POWER-TRANSMITTING MECHANISM.

Application filed October 20, 1919. Serial No. 331,762.

*To all whom it may concern:*

Be it known that I, ARTHUR C. KELLER, a citizen of the United States, residing at Milwaukee, county of Milwaukee, and State of Wisconsin, have invented new and useful Improvements in Power-Transmitting Mechanism, of which the following is a specification.

My invention relates to improvements in power transmitting mechanism for electrically operated cranes and hoists. In some crane installations peculiar conditions of operation require, or make desirable, the handling of a load at high speed during a portion of its movement from the starting to the stopping point. This is especially the case where the runway of the crane is high and the distance to be traveled by the load correspondingly great, making it desirable that the load travel at a high speed during the major portion of its movement, with gradual acceleration at the start and equally gradual retardation at the end of the movement, in order to avoid any sudden jerk or shock due to inertia. The ordinary rheostatic control of a motor has in many cases been found inadequate to avoid shocks or overloads under such conditions.

The object of the invention herein described is to provide controlling apparatus which will be adequate to meet the requirements above indicated and allow the load to be moved at either a high or a low speed at the pleasure of the operator and without danger of shock or of subjecting the mechanism or the motor to excessive strains or overloads.

More particularly stated, the object of my invention is to provide safe and reliable means, whereby a plurality of electric motors may be selectively employed to actuate the same hoisting mechanism at different rates of speed during different stages of a single load moving operation; to provide means whereby the motor having its power transmitting connections organized for moving the load slowly may be automatically disengaged from operative connection with those portions of the mechanism which may be driven by either motor, thereby avoiding back transmission of motion to the armature of such motor from that of the motor which transmits the more rapid motion; and to provide means whereby the electrical connections of the respective motors may be utilized in connection with electro-magnetic devices to connect up and release one of the motors for slow power transmission and to provide brake mechanism for utilizing such motor or its individual power transmitting connections to hold the load at any desired elevation, when the circuit of one motor is interrupted, either for the purpose of connecting up the other or if for any reason, the breaking of the operating circuit would otherwise allow the load to drop. It is also my object to cross connect the motor controllers in such a manner that only one motor can be in operation at any given time, and to provide means whereby any interruption of current to the operating motor will be instantly followed by an automatic action of the brake associated with the smaller or auxiliary motor to hold the load at the attained elevation, pending a resumption of operation by one motor or the other.

In the drawings

Like parts are identified by the same reference characters thruout the several views.

Figure 1:
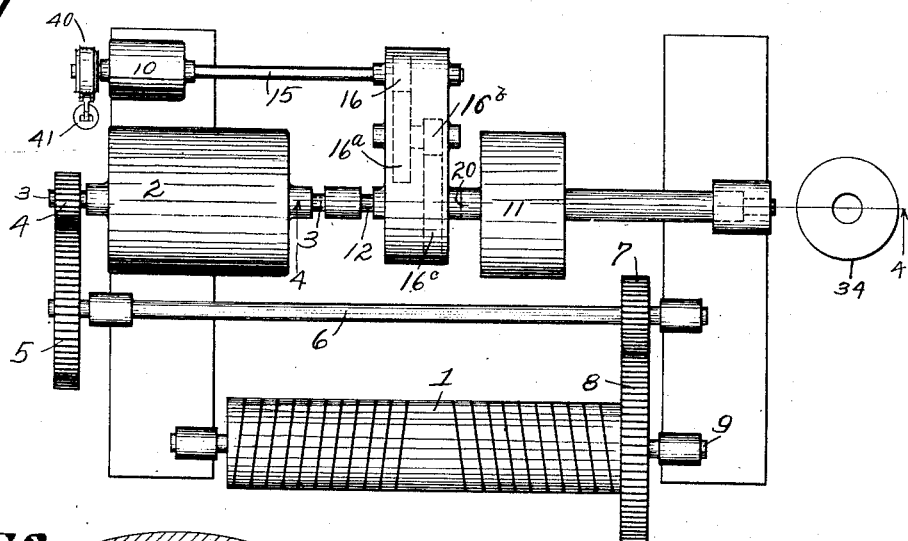
Figure 1 is a plan view of my improved mechanism, showing the elements conventionally in associate relation.
Figure 2:
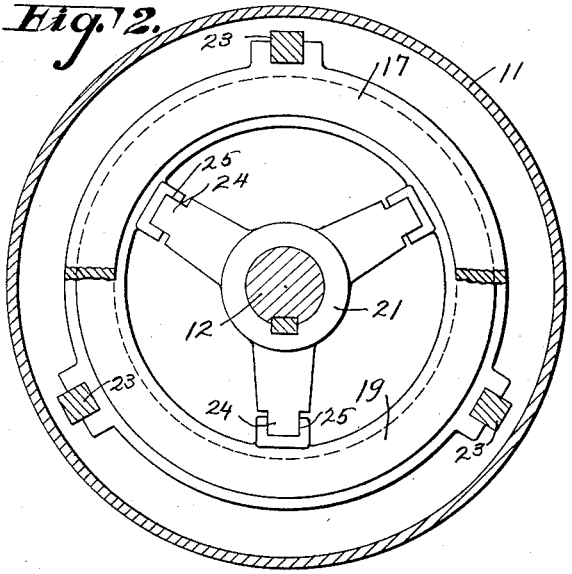
Figure 2 is a cross sectional view thru the clutch housing, drawn generally on line 2—2 of Fig. 4.
Figure 3:
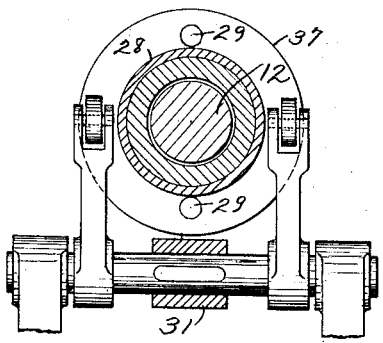
Figure 3 is a cross section on line 3—3 of Fig. 4.
Figure 4:
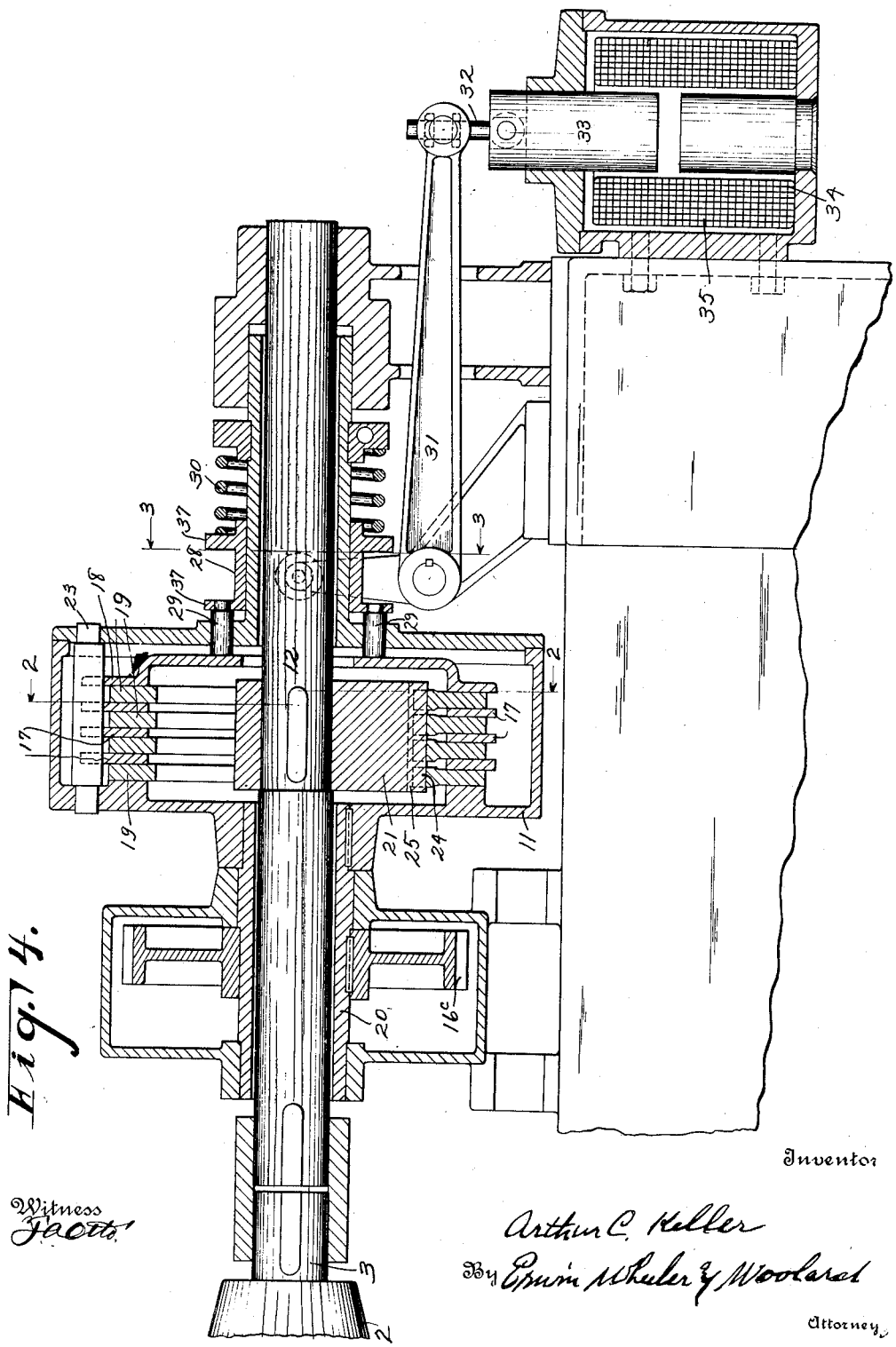
Figure 4 is a sectional view drawn generally on line 4—4 of Fig. 1, and illustrating the clutch and solenoidal clutch operating connection for the auxiliary motor.

The hoisting drum 1 may be actuated from an electric motor 2 which transmits its motion to the drum 1 thru motor shaft 3, pinion 4, gear wheel 5, shaft 6, and gear wheels 7 and 8, the latter being fast on the drum shaft 9 or secured to the drum itself. This mechanism for transmitting motion from the motor 2 to the drum 1 as above specified may be of any ordinary construction, but it will be observed that I have provided an auxiliary motor 10, this motor being also adapted to drive the drum 1 thru a friction clutch illustrated in detail in Fig. 4, and the housing of which is illustrated at 11 in Fig. 1. The motor shaft 3 is provided with an extension 12 connected with the driven member or members of the clutch and when the motor 10 is in operation, it transmits power to the drum 1 thru the shaft 15, the train of reduction gears 16, 16ª, 16ᵇ, and 16ᶜ, a sleeve 20 on shaft 12, the housing 11, clutch disks 17 and 18 (Fig. 4), driven disks 19, hub 21, shaft 12, and thence thru the shaft and gear members 3 to 8 inclusive. The clutch may be of the ordinary multiple disk type in which the driving disks 17 and 18 are notched and connected with the housing 11 by a series of rods or pins 23 loosely fitted to the notches and extending parallel with the shaft extensions 12, with their ends socketed in the side walls of the casing 11. The intermediate or driven disks 19 are provided with inwardly projecting channeled members 25 loosely fitted to extensions 24 of the hub 21, the hub being keyed directly to shaft 12. It will, of course, be understood that when the driving disk 18 is pushed inwardly this disk and the disks 17 are clamped in frictional contact relation to the disks 19 and the opposing wall of the housing for transmission of motion from the driving to the driven disks and thru the hub to the shaft 12.

The means for applying the clamping pressure to the disks 18 and 19 consists of the shifter sleeve 28 and clutch setting pins 29, a compression spring 30 tends to push the sleeve 28 to clutch setting position, from which position the sleeve may be retracted by means of a bell crank lever 31 connected by a link 32 with the plunger 33 of solenoid 34, the winding 35 of which is connected with the source of electrical energy in such a manner as to receive energizing current whenever the circuit of the motor 2 is closed as hereinafter explained. The short arm of bell crank 31 is forked and loosely engaged between the radial flanges 37 of the shifter sleeve 28.

The arrangement is such that when the motor 2 is in operation, solenoid 34 will be energized to draw plunger 33 downwardly and retract shifter sleeve 28 against the pressure of spring 30, but when the current to the motor 2 is cut off, solenoid 34 is de-energized and spring 30 moves sleeve 28 to clutch setting position, thereby operatively connecting the shaft 15 of the smaller motor 10 with the hoisting drum 1 thru the two trains of reduction gears 16 to 16ᶜ inclusive and 4 to 8 inclusive. Therefore, if motor 10 is then in operation it will actuate the drum 1 at low speed. If not in operation, the drum may easily be held stationary, with the load in any desired position of elevation, by a suitable brake applied to a brake drum 40 on motor shaft 15.

It will be obvious from the foregoing description that whenever conditions require a slow movement of the load the motor 10 may be utilized for this purpose, but when it is desired to move the load more rapidly the circuit of this motor may be interrupted and the load held in the desired position by means of the brake at 40 until the motor 2 can be started, whereupon the clutch at 11 will be released automatically by solenoid 34 and the load may then be moved rapidly by motor 2 thru the single train of reduction gears 4 to 8 inclusive. When conditions again require a slower movement of the load than can be properly derived from motor 2, the circuit of this motor will be interrupted, the clutch at 11 automatically set to connect up motor 10 and the brake at 40 utilized to prevent the load from dropping until the motor 10 has been started. The brake at 40 may be assumed to be an ordinary automatically acting or spring actuated brake adapted to be retracted by a solenoid indicated at 41. Such brakes are in common use in connection with motor operated hoists, and their mode of operation and retraction is similar to that of the clutch above described. Detailed illustration and description is therefore deemed unnecessary.

Figure 5:
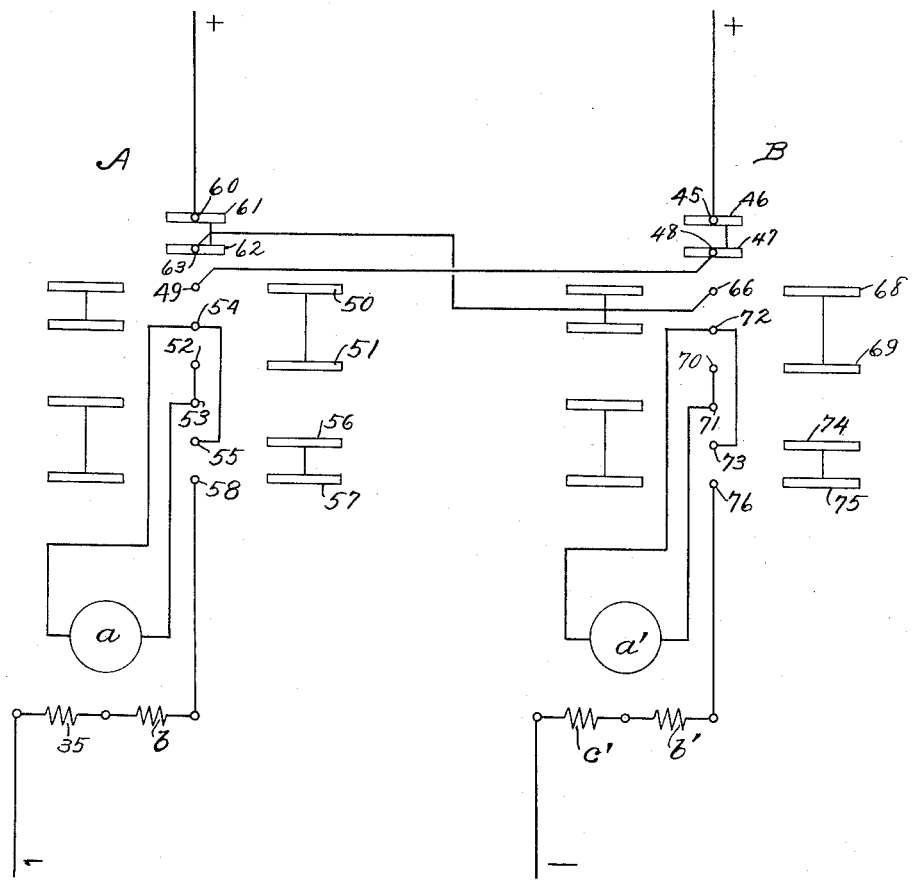
Figure 5 is a wiring diagram.

The motors have co-operating cross connected controllers as indicated at A and B in Fig. 5. The armature of the motor 2 in said figure is indicated at $a$ and the field at $b$. The coil 35 of the clutch controlling solenoid is also shown in its relation to the field circuit. The armature and field of motor 10 are indicated at $a'$ and $b'$ respectively, and the coil of the solenoid brake 41 is shown at $c'$, the operation of this brake being similar to the operation of the clutch by the solenoid 34, the solenoid working in opposition to a brake setting spring.

Assuming that the controller A of the motor 2 is moved to connect up the hoisting circuit, said circuit will be established from the positive side of the line thru the movable controller contact 45 of controller B, segment contacts 46 and 47, and movable contact 48 to 49 of controller A, segments 50 and 51 movable fingers or contact members 52 and 53, armature $a$, movable contacts 54 and 55, segments 56 and 57, and contact finger or member 58 to the motor field $b$, coil 35 of the clutch controlling solenoid 34, and thence to the minus side of the line. The coil of solenoid 34 will then be energized and its plunger 33 will be drawn down to release the driving members 17 and 18 of the clutch from the pressure exerted by spring 30 and allow the clutch disks to slide freely along the surfaces of the driven clutch members 19. The motor 2 will thereupon be started and will actuate the hoisting drum 1 thru the gears 4 and 5, shaft 6 and gears 7 and 8. The shaft extension 12, together with the members 19 of the clutch will of course be ineffective to drive the reduction gearing and shaft 15, whereas, when the motor 2 is operating, these members 19 will be directly driven from such motor, but will transmit no motion, the housing 11 of the clutch being held against rotation by the brake 41, associated with the smaller motor 10.

If it is desired to stop the motor 2 the controller A is returned to neutral position whereupon solenoid 34 will be de-energized immediately and the reaction of spring 30 will set the clutch in holding position by pressing disks 17 and 18 against the disks 19, thereby connecting up the hoisting drum 1 with the shaft 15 of the smaller motor 10, said shaft, however, being held against rotation by the brake 40 whereby the hoisting drum is held against rotation and the load supported until one of the motors is again set in operation.

Assuming that it is then desired to additionally raise the load more slowly, the circuit of the smaller motor 10 is closed thru the medium of controller B, the lever of which is brought to hoisting position whereupon current flows from the positive side of the line to movable finger or member 60, segments 61 and 62, and member 63 of controller A, thence to movable member 66 of controller B, segments 68 and 69, and movable members 70 and 71 to the armature $a'$, then to movable member 72 of the controller, and from member 72 to member 73, segments 74 and 75, movable member 76 to the field $b'$ of the motor 10, and the coil $c'$ of the solenoid 41 which, when energized, releases the brake 40. Thereupon the small or auxiliary motor 10 will be started and will actuate the hoisting drum 1 thru the trains of gears and the friction clutch as above described. If the current to motor 10 is interrupted the brake 40 will immediately set by reason of the solenoid 41 being de-energized, the motor shaft being brought to a quick stop to hold the load at the attained elevation.

The object of cross connecting the two controllers A and B is to prevent the operator from attempting to run both motors simultaneously. If the controller A in either hoisting or lowering position, the contact fingers or movable members 60 and 63 will not be in contact with the segments 61 and 62, and therefore, the current thru controller B to its associated motor is interrupted. Likewise, if controller B is in an operating position, the current thru controller A to the larger motor is interrupted. It is, therefore, necessary that one of the controllers shall be in off or neutral position in order that the other controller may operate to start its associated motor. The circuits of the controllers when adjusted for lowering a load will, of course, be similar to those above described but the motor operation will be reversed.

I claim—

1. In combination, two motors, connected in common to a driven member and each provided with a controller, additional contacts in each controller and cross connections between the supply lines and each controller thru the additional contacts of the other controller, whereby the current for either motor passes thru both controllers to make the operation of either motor dependent upon the controller of the other being in neutral position.

2. Hoisting mechanism including a winding drum in combination with main and auxiliary co-operating electric motors, an automatically acting brake for the auxiliary motor, adapted to hold its shaft against rotation when the current to such motor is interrupted, a train of reduction gears and a friction clutch, connecting the auxiliary motor with the shaft of the main motor, a spring for setting the clutch in power transmitting position, an electrically operated device connected in circuit with the main motor to retract the clutch when the circuit of the main motor is closed, a controller for each of said main and auxiliary motors, additional contacts in each of said controllers, and cross connections between the supply lines and the controllers through additional contacts of the other controller whereby the current for either motor passes through both controllers to make the operation of either motor dependent upon the controller of the other being in neutral position.

3. In a hoisting mechanism, the combination with a main motor provided with a field winding, and an auxiliary motor provided with a field winding, and a drum provided with driving connections for actuation by either of said motors, of a clutch provided with a controlling coil connected in series with the field-winding of the main motor, a brake operative upon a portion of said driving connections and provided with a controlling coil connected in series with the field winding of the auxiliary motor, independently manually operable controllers arranged to control the energizing field windings of each motor and the coil connected in series therewith, additional contacts in each of said controllers, cross connections between the supply lines and the controllers through the additional contacts of the other controller whereby the current for either motor passes through both controllers to make the operation of either motor dependent upon the the controller of the other being in neutral position.

In testimony whereof I affix my signature in the presence of two witnesses.

ARTHUR C. KELLER.

Witnesses:
O. C. WEBER,
A. J. McKERIBAN.